UNITED STATES PATENT OFFICE.

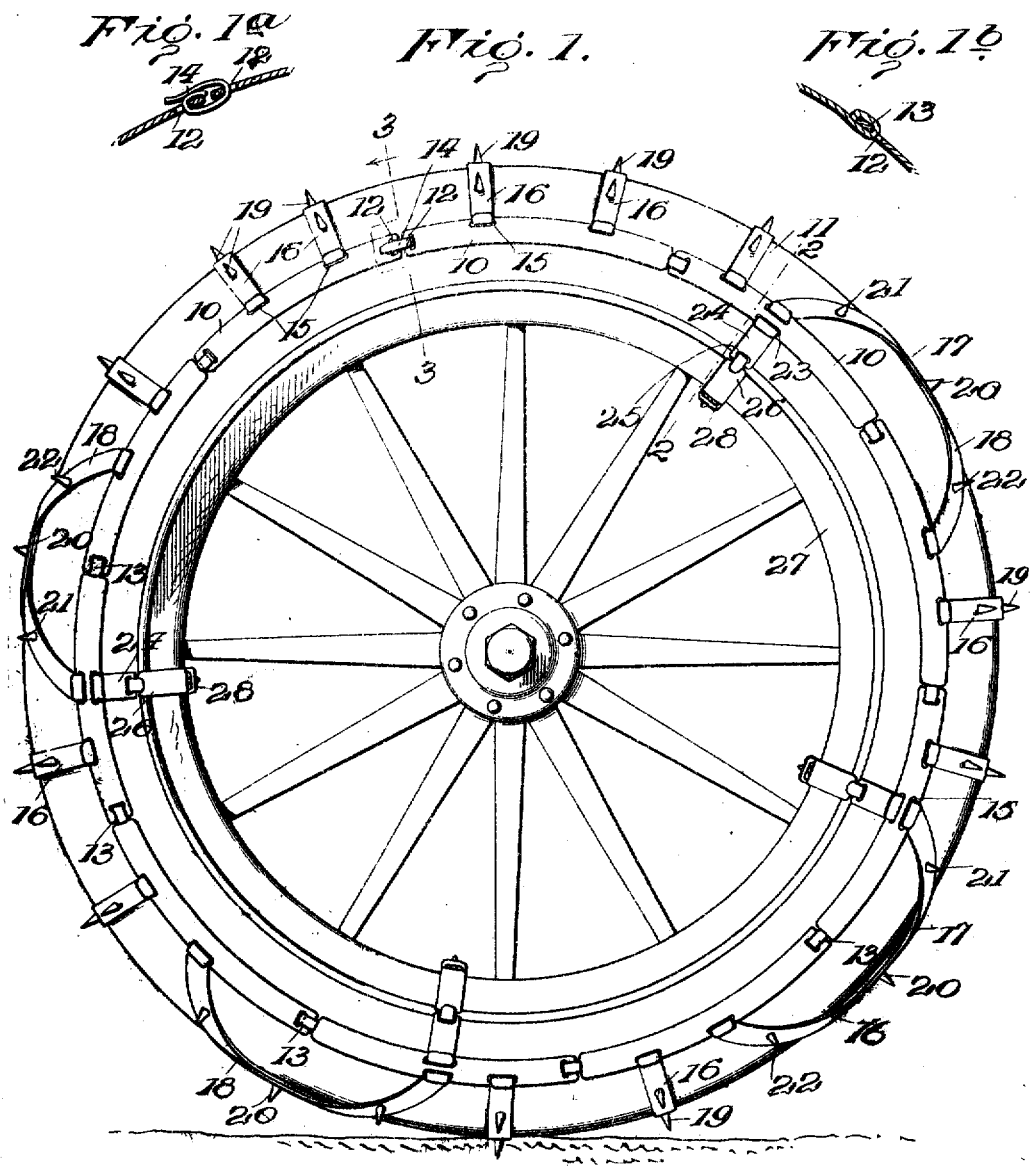

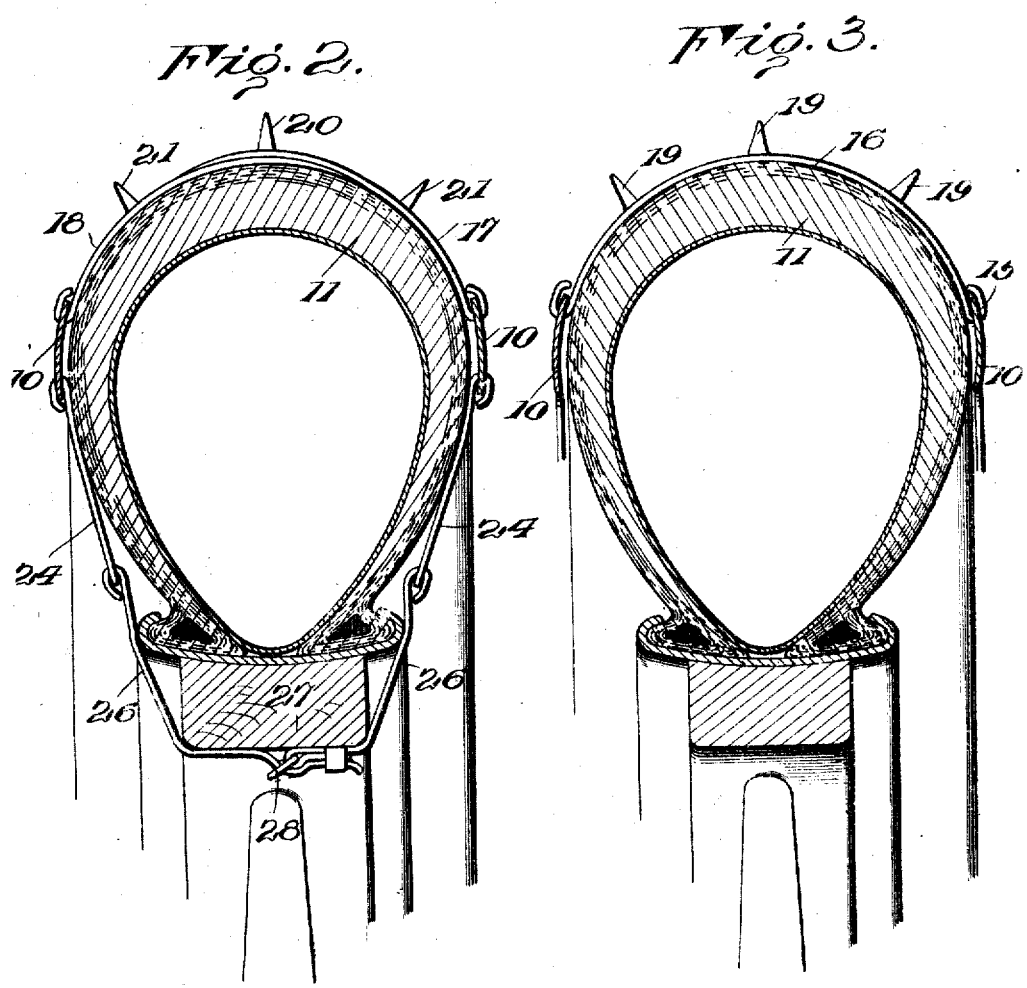

MARTHA M. DUFF, OF ARNOLD, PENNSYLVANIA.

ANTISKIDDING ATTACHMENT FOR WHEELS.

1,312,436.      Specification of Letters Patent.      Patented Aug. 5, 1919.

Application filed October 1, 1918. Serial No. 256,421.

*To all whom it may concern:*

Be it known that I, MARTHA M. DUFF, a citizen of the United States, residing at Arnold, in the county of Westmoreland and State of Pennsylvania, have invented certain new and useful Improvements in Antiskidding Attachments for Wheels, of which the following is a specification.

This invention relates to improvements in anti-skidding attachments for automobile tires, and has for one of its objects to improve the construction and increase the efficiency and utility of devices of this character.

Another object of the invention is to provide a device of this character which operates effectually to prevent skidding and which will not injure the tire casing.

With these and other objects in view, the invention consists in certain novel features of construction, as hereinafter shown and described and then specifically pointed out in the claims; and in the drawings illustrative of the preferred embodiment of the invention—

Figure 1 is a side elevation of an automobile wheel with the improvement applied.

Fig. 2 is a transverse section on the line 2—2 of Fig. 1,

Fig. 3 is a transverse section on the line 3—3 of Fig. 1,

Figs. 1ᵃ and 1ᵇ are enlarged detail longitudinal sections showing different forms of connections between sections of the device.

The improved device may be applied without material structural change to tire casings of various sizes, and comprises side members formed of a plurality of segmental sections hingedly united at their confronting ends and bearing against the opposite sides of the tire casing. The segmental sections are indicated by the character 10, and will be sufficient in number to entirely encircle the tire casing, represented at 11. The members 10 are curved to correspond to the curvature of the tire casing and each member is provided with a slot 12 at one end and a tongue 13 extending from the opposite end. The tongue of each section 10 is adapted to be inserted through the slot 12 of the adjacent section and bent over the terminal of the same as illustrated in Fig. 1ᵇ. The terminals of the bands produced by connecting the sections are without the tongues but provided each with a slot. A flexible coupling strip 14 is inserted through the slots at the said ends of the bands and doubled on itself to flexibly connect the bands as shown in Fig. 1ᵃ. Each section 10 is provided with a longitudinal slot 15 as shown. The slots 15 of the sections may be engaged by straps or bands 16 extending over the casing 11, the ends of the straps 16 being slightly reduced to produce tongues adapted to be bent around the material between the slots 15 and the outer edges of the sections as shown in Fig. 3. By this means the hingedly united side members are coupled over the casing at opposite sides of the uniting straps 14. Each pair of the remaining segmental sections at each side of the casing are united by diagonally directed straps 17—18, crossing each other intermediate their ends centrally of the tire. For instance the strap 17 is passed at one end through the slot 15 of one of the sections 10 and bent over the material of the section externally of the slot, and thence extended obliquely over the casing and similarly coupled to the slot 15 of the next section at the opposite side of the casing. The other strap 18 is passed at one end through the slot 15 of the next section 10 and thence extended obliquely over the casing in the opposite direction from the first-mentioned obliquely directed strap and crossing the same intermediate the ends, and coupled through the slot of the adjacent section at the opposite side of the casing. The diagonally directed straps thus effectually brace and support the segmental sections in position and coact with the straps 16 to prevent skidding or slipping of the wheel upon muddy or inclined roads or in soft or sandy roads. Suitably formed ground-engaging spurs 19 are connected to the straps 16. At their crossing points each pair of the straps 17—18 are united by a similar spur 20, which spurs thus serve the two-fold purpose of holding the straps 17—18 in position, and to produce a series of ground-engaging spurs centrally of the tire casing. The straps 17 are likewise provided with additional ground-engaging spurs 21, while the straps 18 are provided with additional ground-engaging spurs 22. The spurs 19, 21, and 22 are inclined outwardly away from the center of the tire casing, while the spurs 20 project directly outwardly or at right angles to the axial line of said casing.

A certain number of the sections 10, for instance six as shown, are provided with longitudinally directed slots 23 intermediate their ends to receive holding straps 24, the latter having transverse slots 25 at their inner ends to receive binding straps 26, which pass beneath the felly 27 and are provided with buckles 28. By this means the improved attachment may be effectually coupled to the wheel, and detached therefrom, when not required.

It will be noted that the various members 10—16—17 and 18 are constructed from flat metal strips bent to conform to the shape of the tire casing and therefore will not produce abrasion thereof when in use.

The improved device is simple in construction and can be inexpensively manufactured of relatively small portions of sheet metal or steel.

The attachment, including the ground-engaging spurs, when applied to an automobile wheel, will effectually prevent skidding or slipping upon muddy or soft roads, and will thus amply protect the occupants of the automobile.

Having thus described the invention, what is claimed as new is:

1. An anti-skidding device comprising spaced side members each formed of a plurality of segmental sections hingedly united and adapted to bear against the opposite sides of a tire casing, and a plurality of members coupled at their ends to certain of the segmental sections and extending in reversely oblique directions over the casing and crossing at the junction of adjacent sections.

2. An anti-skidding device comprising spaced side members adapted to bear against the opposite sides of a tire casing and each formed of a plurality of pivotally united segmental sections, transverse straps connecting certain of the segmental sections of the side members, other straps extending in reversely oblique directions over the tire casing and connected with other of said segmental sections, the last-mentioned straps crossing at the junction of adjacent sections and all of said straps being provided with traction devices.

3. The combination with a wheel including a felly and tire, of an anti-skidding device comprising spaced side members bearing against the opposite sides of the tire and each formed of a plurality of pivotally united sections, anti-skidding members coupled at their ends to certain of the segmental sections and extending in reversely oblique directions over the tire and crossing at the junction of adjacent sections, and means for securing the side memebers in position on the tire.

4. The combination with a wheel including a felly and tire, of an anti-skidding device comprising spaced members bearing against the opposite sides of the tire and each formed of a plurality of pivotally connected segmental sections, there being longitudinal slots formed in the several segmental sections, transverse straps fastened in certain of the longitudinal slots, other straps extending over the tire and having their ends fastened in other of the longitudinal slots in said sections, and means for securing the device in position on the tire.

In testimony whereof I affix my signature.

MRS. MARTHA M. DUFF. [L. S.]